(12) United States Patent
Okuda

(10) Patent No.: US 8,554,069 B2
(45) Date of Patent: Oct. 8, 2013

(54) IMAGING UNIT

(75) Inventor: Isao Okuda, Saitama (JP)

(73) Assignee: Hoya Corporation, Tokyo (JP)

( * ) Notice: Subject to any disclaimer, the term of this patent is extended or adjusted under 35 U.S.C. 154(b) by 132 days.

(21) Appl. No.: 13/239,895

(22) Filed: Sep. 22, 2011

(65) Prior Publication Data

US 2012/0075523 A1 Mar. 29, 2012

(30) Foreign Application Priority Data

| | | |
|---|---|---|
| Sep. 29, 2010 | (JP) | 2010-219530 |
| Oct. 13, 2010 | (JP) | 2010-230839 |
| Oct. 15, 2010 | (JP) | 2010-232558 |
| Feb. 3, 2011 | (JP) | 2011-021974 |

(51) Int. Cl.
*G03B 17/02* (2006.01)
*H04N 5/225* (2006.01)

(52) U.S. Cl.
USPC .......................................... 396/535; 348/340

(58) Field of Classification Search
USPC .................. 396/535; 348/335, 340
See application file for complete search history.

(56) References Cited

U.S. PATENT DOCUMENTS

| | | | |
|---|---|---|---|
| 7,170,558 B2* | 1/2007 | Yokota et al. ................. | 348/337 |
| 7,388,192 B2* | 6/2008 | Chang et al. ................. | 250/239 |
| 8,107,004 B2* | 1/2012 | Nomura et al. ............... | 348/374 |
| 2005/0253951 A1* | 11/2005 | Fujimoto et al. ............. | 348/335 |
| 2006/0017834 A1 | 1/2006 | Konno et al. | |
| 2007/0024739 A1* | 2/2007 | Konno .......................... | 348/337 |
| 2008/0225139 A1* | 9/2008 | Nomura et al. ............ | 348/240.3 |
| 2008/0291543 A1 | 11/2008 | Nomura et al. | |
| 2010/0141825 A1 | 6/2010 | Kim et al. | |

FOREIGN PATENT DOCUMENTS

| | | |
|---|---|---|
| JP | 2006-154705 | 6/2006 |
| JP | 2008-242446 | 10/2008 |
| JP | 2010-141865 | 6/2010 |

OTHER PUBLICATIONS

U.S. Appl. No. 12/036,459 to Hiroshi Nomura et al., filed Feb. 25, 2008.
U.S. Appl. No. 13/239,930 to Isao Okuda, filed Sep. 22, 2011.
U.S. Appl. No. 13/239,909 to Isao Okuda, filed Sep. 22, 2011.
U.S. Appl. No. 13/231,087 to Isao Okuda, filed Sep. 13, 2011.

* cited by examiner

*Primary Examiner* — Christopher Mahoney
(74) *Attorney, Agent, or Firm* — Greenblum & Bernstein P.L.C.

(57) ABSTRACT

An imaging unit includes a housing having an opening on one of opposite sides in a direction of thickness thereof; an imaging optical system provided in the housing and includes an incident surface and an exit-side prism, wherein object-emanated light being incident on said incident surface and traveling in a lengthwise direction of said housing is reflected by said exit-side prism toward said opening; an image sensor, installed in the housing, with an imaging surface facing the other of the opposite sides of the housing toward an exit surface of the exit-side prism; a spacer projecting from the housing or a fixed member, the spacer contacting the image sensor to create a clearance between the exit surface and the imaging surface; and a cover fixed to the housing to close the opening and press the image sensor so as to come in contact with the spacer.

8 Claims, 11 Drawing Sheets

IMAGING UNIT

BACKGROUND OF THE INVENTION

1. Field of the Invention

The present invention relates to an imaging unit having an imaging optical system and an image sensor that captures light emanating from a photographic object which is passed through the imaging optical system. The imaging optical system and the image sensor are accommodated in a housing of the imaging unit.

2. Description of the Related Art

In recent years, mobile electronic devices which are designed mainly for taking still/moving photographic images, such as digital cameras (still-video cameras) and digital camcorders (motion-video cameras), and other mobile electronic devices which are designed to have the capability of taking such photographic images as a subsidiary function, such as mobile phones equipped with a camera and personal digital assistants (PDAs) equipped with a camera, have become widespread. In these types of mobile electronic devices, it is common to provide the mobile electronic device therein with an imaging unit which is structured such that an image sensor and a photographing optical system for leading light emanating from a photographic object (object to be photographed) to the image sensor are accommodated in a hollow housing of the imaging unit. Additionally, in recent years, the downsizing (slimming down) of the mobile electronic devices has further progressed, so that the demand to also slim down the imaging unit has become stronger.

Japanese Unexamined Patent Publications Nos. 2008-242446 and 2006-154705 disclose examples of conventional imaging units. Each of these imaging units is provided with a box-shaped housing, and further provided in this housing with an imaging optical system (an incident-side prism, an exit-side prism and lens groups between the incident-side prism and the exit-side prism) and an image sensor, the imaging surface of which faces the exit surface of the exit-side prism in the direction of the thickness of the housing. The traveling direction of light which emanates from a photographic object to be incident on the incident-side prism (which serves as an incident portion of the imaging optical system) changes (i.e., is reflected) at an angle of 90 degrees by the incident-side prism, and thereafter passes through the aforementioned lens groups to be incident on the exit-side prism. Thereupon, the traveling direction of the light incident on the exit-side prism again changes (i.e., is reflected) at an angle of 90 degrees by the exit-side prism so that the light reflected by the exit-side prism exits therefrom through the exit surface of the exit-side prism and is eventually received (captured) by the imaging surface (photosensitive surface) of the image sensor.

Since the imaging units disclosed in the aforementioned two Japanese unexamined patent publications are configured such that the imaging optical system is a bending optical system using prisms, the thickness of the entire imaging unit can be reduced in each imaging unit.

In order for the image sensor of the imaging unit to exhibit a desired imaging capability, the image sensor and the exit-side prism need to be positioned so that the distance (in the direction of the thickness of the housing) between the imaging surface of the image sensor and the exit surface of the exit-side prism corresponds precisely with a designed value (distance).

Although neither of the aforementioned two Japanese unexamined patent publications discloses a positioning device (fixing device) for positioning the imaging surface of the image sensor and the exit surface of the exit-side prism, each of the imaging units disclosed in these two patent publications can make the most of desired imaging capabilities thereof if the exit-side prism and the image sensor are fixed to each other by an adhesive with the distance therebetween being adjusted (a similar technique is disclosed in Japanese Unexamined Patent Publication No. 2010-141865).

However, using an adhesive to fix the exit-side prism and the image sensor to each other makes the installing/assembling of the image sensor and the exit-side prism difficult.

Additionally, if the exit-side prism and the image sensor are fixed to each other by an adhesive with the distance therebetween deviating from a design value or with dust or the like getting therebetween, the exit-side prism and the image sensor need to be bonded again after being separated from each other. However, since it is difficult to separate the exit-side prism and the image sensor from each other after fixing using an adhesive, it is difficult to reuse the exit-side prism and the image sensor.

SUMMARY OF THE INVENTION

The present invention provides an imaging unit which is structured to make it possible to carry out the positioning of the image sensor and the exit-side prism easily and to separate the image sensor and the exit-side prism easily after the positioning, while achieving a reduction in thickness of the entire imaging unit.

According to an aspect of the present invention, an imaging unit is provided, including a housing having an opening on one of opposite sides thereof in a direction of thickness of the housing; an imaging optical system which is provided in the housing and includes an incident surface and an exit-side prism, wherein object-emanated light being incident on said incident surface and traveling in a lengthwise direction of the housing is reflected by the exit-side prism toward the opening; an image sensor which is installed in the housing and includes an imaging surface that faces the other of the opposite sides of the housing in the direction of thickness of the housing to face an exit surface of the exit-side prism; a spacer which projects from one of the housing and a fixed member, which is immovable with respect to the housing, the spacer being in contact with the image sensor to create a clearance between the exit surface and the imaging surface; and a cover which is fixed to the housing so as to close the opening and presses the image sensor so that the image sensor comes in contact with the spacer.

It is desirable for the housing to include a prism mounting recess which accommodates the exit-side prism, and for the spacer to be integrally formed with the housing so as to project toward the image sensor from a periphery of the prism mounting recess.

It is desirable for the housing to include a prism mounting recess which accommodates the exit-side prism, and for the imaging unit to include a packing made of an elastic material which is in contact with both a periphery of the prism mounting recess of the housing and with an outer periphery of the imaging surface of the image sensor.

It is desirable for the packing to include a through-hole, the spacer passing through the through-hole to come in contact with the image sensor.

It is desirable for the housing to include a prism mounting recess which accommodates the exit-side prism, and for the spacer to be provided independently of the housing and be in contact with both a periphery of the prism mounting recess of the housing and with an outer periphery of the imaging surface of the image sensor.

It is desirable for the spacer to be provided independently of the housing and to be in contact with both the exit surface of the exit-side prism and with an outer periphery of the imaging surface of the image sensor.

It is desirable for the housing to include a prism mounting recess which accommodates the exit-side prism, and for the fixed member to include a packing made of an elastic material which is in contact with both a periphery of the prism mounting recess of the housing and with an outer periphery of the imaging surface of the image sensor. The spacer is made of a material harder than a material of the packing and is integrally formed with the packing.

It is desirable for the through-hole of the packing to serve as an exposing hole through which the exit surface of the exit-side prism is exposed toward the imaging surface.

It is desirable for the packing to be provided with an exposing hole which is formed independently of the through-hole and through which the exit surface of the exit-side prism is exposed toward the imaging surface.

According to the present invention, upon the opening of the housing being closed by the cover, the image sensor is pressed toward the spacer, which is formed to project from the housing or the fixed member, to come into contact with the spacer. Thereupon, the exit surface of the exit-side prism and the imaging surface of the image sensor are positioned with a clearance having a predetermined size being created therebetween, which makes it possible for the image sensor to exhibit a desired imaging capability. Moreover, since the image sensor and the spacer are simply made to be in contact with each other mechanically, the positioning of the image sensor and the exit-side prism can be easily carried out and also the image sensor and the exit-side prism can be easily separated after the positioning.

Furthermore, the imaging unit (housing) can be slimmed down because the imaging optical system includes the incident surface and the exit-side prism which are arranged to allow object-emanated light being incident on the incident surface to travel in the lengthwise direction of the housing to the exit-side prism, and to be reflected at the exit-side prism toward the opening.

The present disclosure relates to subject matter contained in Japanese Patent Applications Nos. 2010-219530 (filed on Sep. 29, 2010), 2010-230839 (filed on Oct. 13, 2010), 2010-232558 (filed on Oct. 15, 2010) and 2011-021974 (filed on Feb. 3, 2011) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENTS

Figure 1:
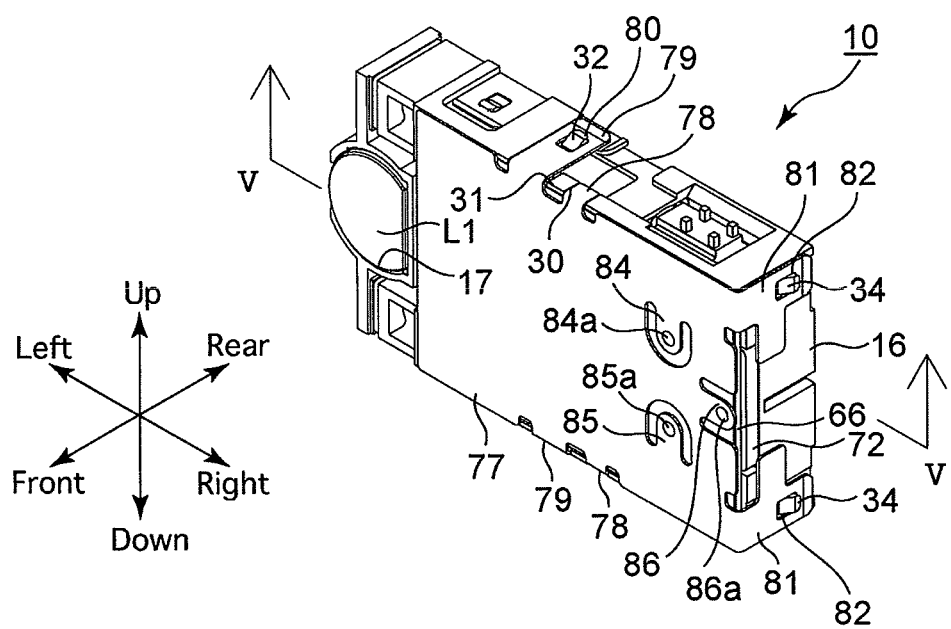
FIG. 1 is a front perspective view of an embodiment of an imaging unit according to the present invention, viewed obliquely from above.

In the following descriptions, forward and rearward directions, leftward and rightward directions, and upward and downward directions are determined with reference to the directions of the double-headed arrows shown in the drawings.

Figure 2:
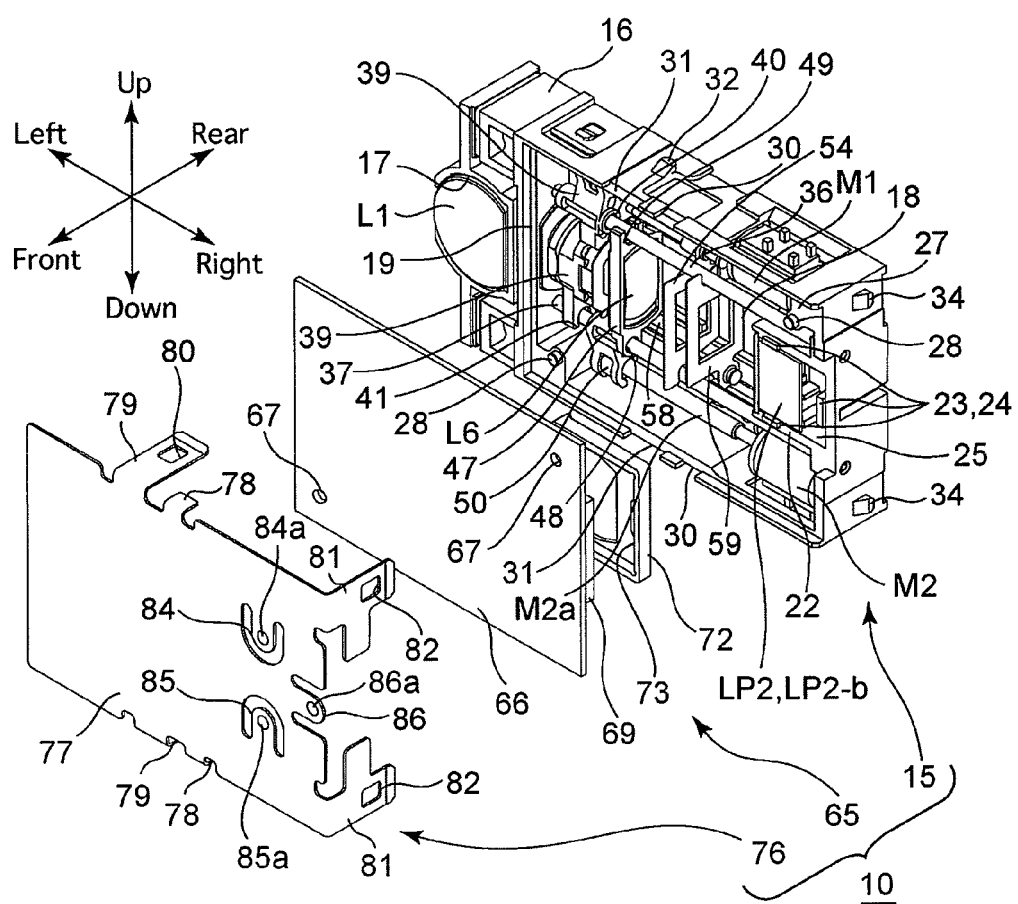
FIG. 2 is a front exploded perspective view of the imaging unit, viewed obliquely from above.
Figure 3:
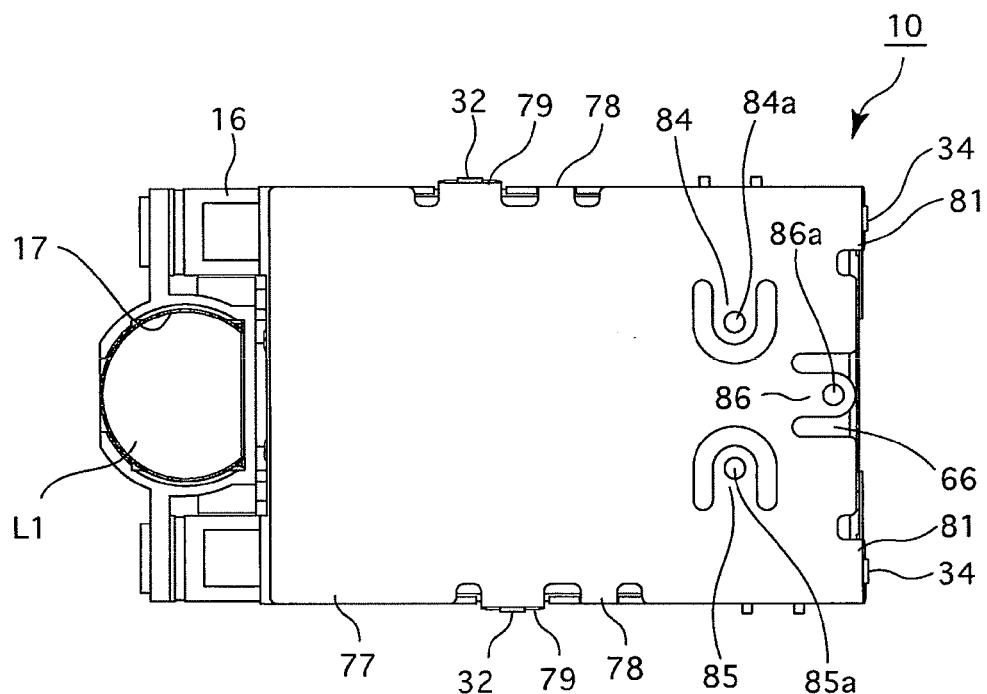
FIG. 3 is a front elevational view of the imaging unit.

As shown in FIGS. 1 and 2, the imaging unit 10 is provided with a body module 15, a board module 65 and a cover 76 constitute the major components of the imaging unit 10.

The body module 15 is provided with a housing (casing) 16 made of synthetic resin. The housing 16 is provided at the front left end thereof with a mounting recess 17 formed into the shape of a letter D in cross section. In addition, the housing 16 is provided, on the front thereof except this front left end (on the substantially entire front part of the housing 16), with a substantially rectangular accommodating recess (opening) 18. The housing 16 is provided between the mounting recess 17 and the accommodating recess 18 with a partition wall 19. The housing 16 is provided at a center of the partition wall 19 with a communication hole (through-hole) 20 (see FIGS. 4 through 6) via which the mounting recess 17 and the accommodating recess 18 are communicatively connected with each other. The housing 16 is provided, in the accommodating recess 18 at the right end thereof, with a positioning portion 22 having a substantially rectangular shape, in a front view, which projects forward from the base of the accommodating recess 18 (i.e., from a front surface of the base surface in the accommodating recess 18). The positioning portion 22 is provided with three positioning projections 23 (spacers) which project forward, and the front end surfaces of the three positioning projections 23 are formed as flat positioning surfaces 24 which lie in a common plane orthogonal to the forward/rearward direction (i.e., the direction of the thickness of the housing 16). In addition, the housing 16 is provided in the positioning portion 22 with a prism mounting recess 25 which is open at the front and left sides. The positioning portion 22 is provided on the left side thereof with a pair of (upper and lower) limit projections (light shield frame position limit portions) 26 which project leftward (see FIG. 6), and the left end surface of the pair of limit projections 26 are formed as light shield frame position limit surfaces 26a which are flat surfaces lying in a common plane orthogonal to the leftward/rightward direction (i.e., in a common plane orthogonal to the longitudinal direction of the housing 16). The housing 16 is provided, around the front edge of the inner peripheral surface of the accommodating recess 18, with a board support surface 27 which is positioned behind the frontmost end of the housing 16 and lies in a plane orthogonal to the forward/rearward direction, and is further provided on the board support surface 27 with two lock projections 28 which project forward from the board support surface 27. The housing 16 is provided, at the front end of the center of the upper surface of the housing 16, with a first engaging recess 30 which is recessed downward from the upper surface (periphery) of the housing 16. The housing 16 is also provided, at the front end of the upper surface of the housing 16 on the left-hand side of the first engaging recess 30, with a second engaging recess 31 which is recessed downward from the upper surface (periphery) of the housing 16 by the same amount as the first engaging recess 30 and is wider than the first engaging recess 30. The housing 16 is provided in the second engaging recess 31 with an engaging projection 32. The housing 16 is also provided on the lower surface thereof with a first engaging recess 30, a second engaging recess 31 and an engaging projection 32 which have the same configurations as those provided on the upper surface of the housing 16. The positional relationship between the first engaging recess 30, the second engaging recess 31 and the engaging projection 32 which are formed on the lower surface of housing 16 is identical to the positional relationship between the first engaging recess 30, the second engaging recess 31 and the engaging projection 32 which are formed on the upper surface of housing 16; however, the positions of the first engaging recess 30, the second engaging recess 31 and the engaging projection 32 which are formed on the lower surface of the housing 16 in the leftward/rightward direction are all shifted to the right with respect to those formed on the upper surface of the housing 16. Additionally, the housing 16 is provided on the right side thereof with a pair of (upper and lower) engaging projections 34.

Figure 4:
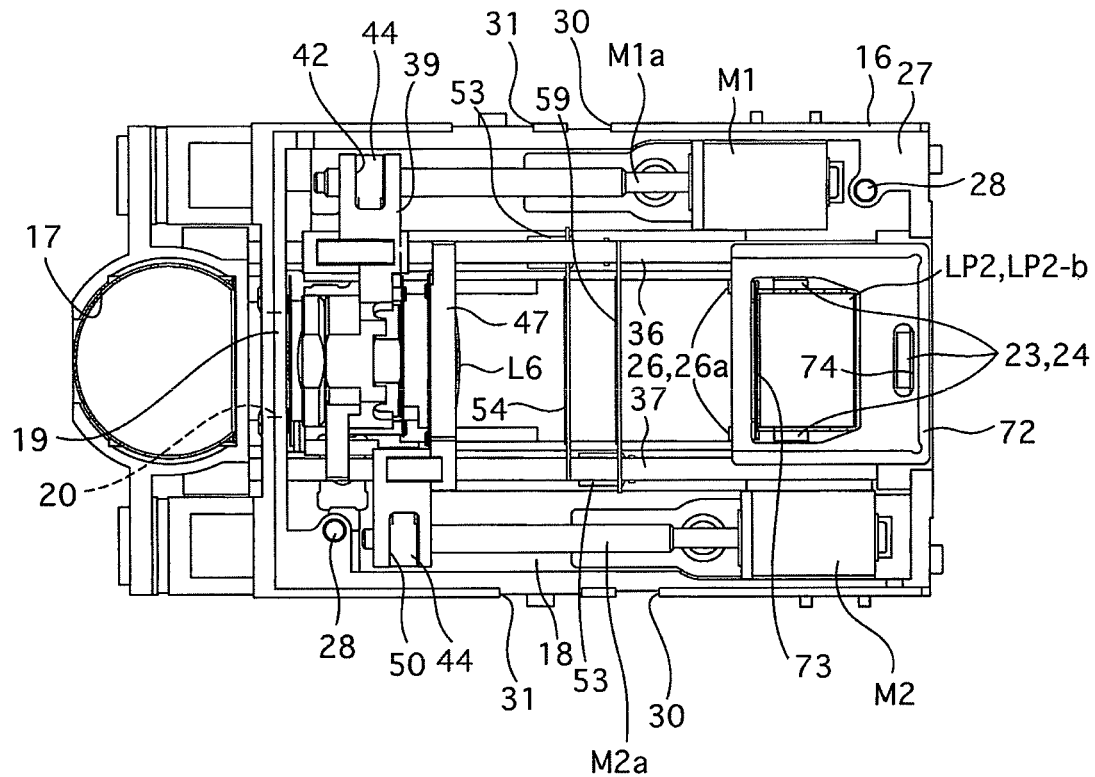
FIG. 4 is a front elevational view of the imaging unit with a cover and a circuit board removed when an imaging optical system is set at the telephoto extremity.
Figure 5:
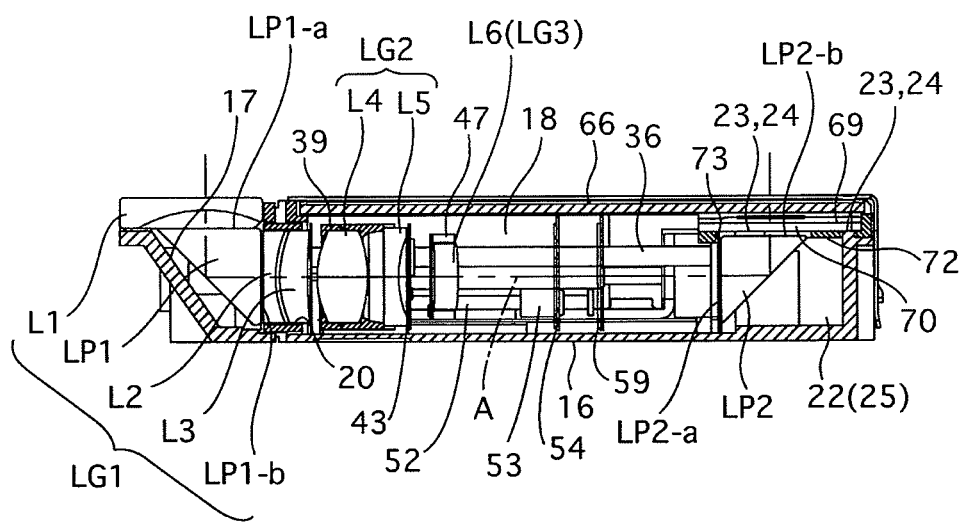
FIG. 5 is a cross sectional view taken along the line V-V shown in FIG. 1 when the imaging optical system is set at the telephoto extremity.
Figure 6:
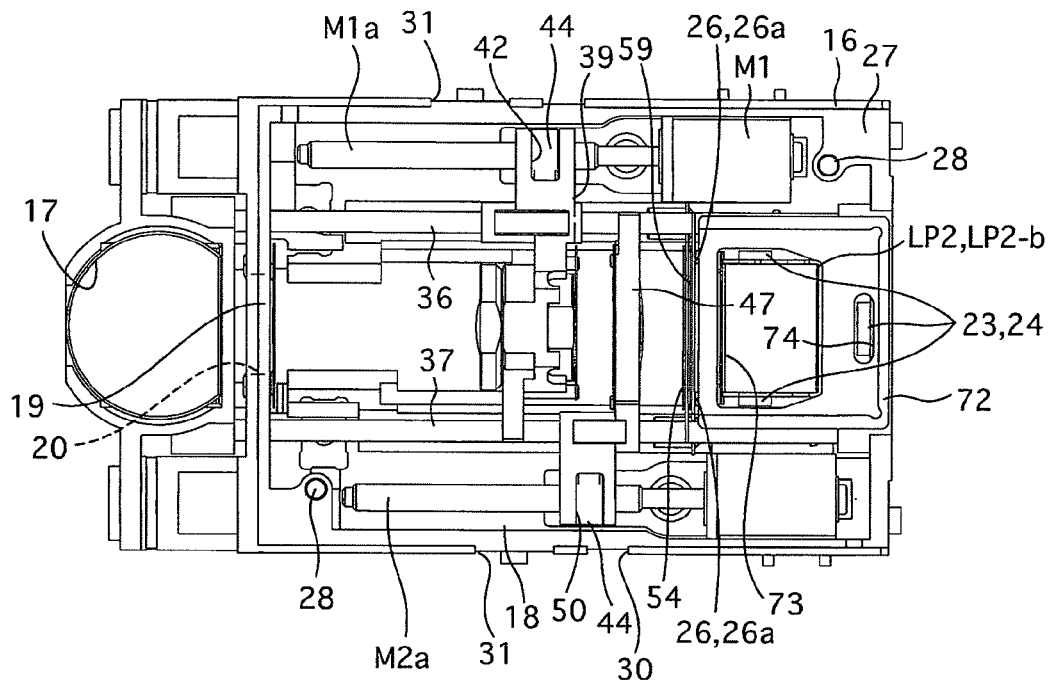
FIG. 6 is a view similar to that of FIG. 4, showing the imaging unit with the cover and the circuit board removed when the imaging optical system is set at the wide-angle extremity.
Figure 7:
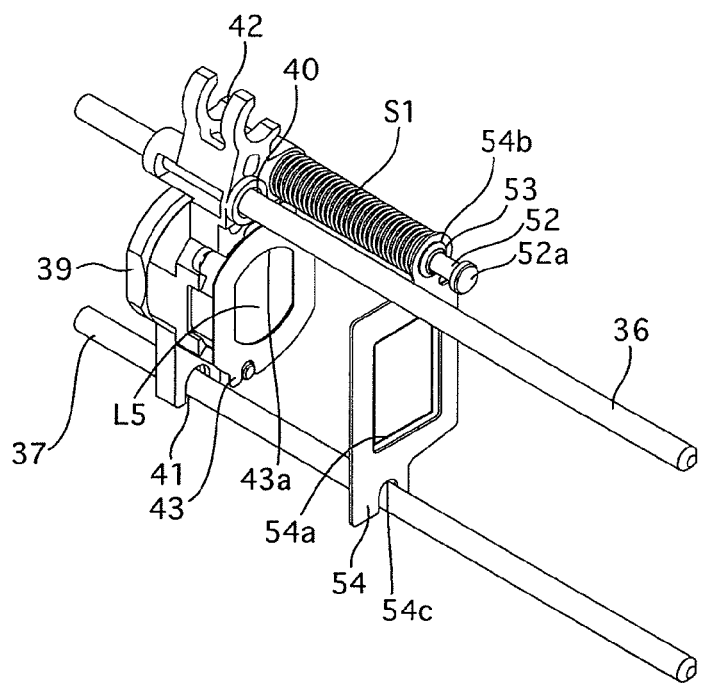
FIG. 7 is a perspective view of a second lens group frame, a first light shield frame and peripheral parts.

As shown in FIGS. 4 through 6, the body module 15 is provided in the mounting recess 17 with a first prism (incident-side prism/incident-side reflecting surface) LP1 that is fit-engaged in the mounting recess 17 and fixed thereto. The first prism LP1 is provided with an incident surface LP1-a which is orthogonal to the forward/rearward direction and an exit surface LP1-b which is orthogonal to the leftward/rightward direction. The body module 15 is provided with a lens (lens element) L1 which is fitted into the front end of the mounting recess 17 and fixed thereto. The lens L1 is substantially the same in cross sectional shape as the mounting recess 17, and the optical axis of the lens L1 extends in the forward/rearward direction. The front surface of the lens L1 is exposed to the front of the imaging unit 10, and the rear surface of the lens L1 and the incident surface LP1-a face each other in the forward/rearward direction. As shown in FIGS. 2 and 5, the body module 15 is provided with two lenses (lens elements) L2 and L3 which are fixedly fitted into the communication hole 20 to face the exit surface LP1-b of the first prism LP1 in the leftward/rightward direction. The lens L1, the first prism LP1, the lens L2 and the lens L3 are optical elements of a first lens group LG1 provided in the body module 15.

The body module 15 is provided in the prism mounting recess 25 with a second prism (exit-side prism/exit-side reflecting surface) LP2 that is fit-engaged in the prism mounting recess 25 and fixed thereto. The second prism LP2 has an incident surface LP2-a which is orthogonal to the leftward/rightward direction and an exit surface LP2-b which is orthogonal to the forward/rearward direction. The incident surface LP2-a faces the exit surface LP1-b in the leftward/rightward direction.

The body module 15 is provided with a first rod (cylindrical rod) 36 and a second rod (cylindrical rod) 37 which are made of metal and extend linearly in the leftward/rightward direction. The first rod 36 and the second rod 37 are each fixed at both ends thereof to an inner surface of the right side wall of the housing 16 and the partition wall 19 so that the left ends of the first rod 36 and the second rod 37 are aligned in the upward/downward direction and so that the right ends of the first rod 36 and the second rod 37 are aligned in the upward/downward direction.

The body module 15 is provided with a second lens group frame 39 made of synthetic resin. An insertion hole 40 in which the first rod 36 is inserted is formed through the upper part of the second lens group frame 39, and a rotation prevention groove 41 in which the second rod 37 is engaged is formed in the lower end of the second lens group frame 39. The second lens group frame 39 is prevented from rotating about the first rod 36 by the engagement of the rotation prevention groove 41 with the second rod 37, and accordingly, the second lens group frame 39 can slide on and along the first rod 36 and the second rod 37 in the leftward/rightward direction. The body module 15 is provided with a second lens group (movable lens group/first movable lens group) LG2 configured of two lenses (lens elements) L4 and L5 which face the exit surface LP1-b of the first prism LP1 and the incident surface LP2-a of the second prism LP2 in the leftward/rightward direction, respectively. The second lens group LG2 is fixedly fitted into a lens holding hole which is formed through the second lens group frame 39 in the leftward/rightward direction. A light shielding sheet 43 which is provided at a center thereof with a light-bundle limiting aperture 43a is fixed to the right side surface of the second lens group frame 39 so that the center of the light-bundle limiting aperture 43a is positioned coaxially with the optical axis of the lenses L4 and L5. In addition, a nut holding hole 42, both ends of which in the leftward/rightward direction are formed as open ends, is formed at the upper end of the second lens group frame 39, and a driven nut (upper driven nut) 44 through which a female screw hole with the axis thereof extending in the leftward/rightward direction is formed is fixedly fitted into the nut holding hole 42 (the end of the nut holding hole 42 at the first rod 36 constitutes a rotation stop for the upper driven nut 44). The body module 15 is provided with a first motor M1 configured of a stepping motor which is fixed to the housing 16 in the upper part of the accommodating recess 18. The first motor M1 is provided with a rotary drive shaft M1a which extends linearly leftwards, and a male screw thread formed on the rotary drive shaft M1a in the vicinity of the end (left end with respect to FIG. 4) thereof is screw-engaged with the aforementioned female screw hole of the upper driven nut 44. Accordingly, forward and reverse rotations of the rotary drive shaft M1a that are caused by forward and reverse rotations of the first motor M1 cause the second lens group frame 39 (the lenses L4 and L5) to move linearly between the telephoto extremity position (shown in FIGS. 4 and 5) and the wide-angle extremity position (shown in FIG. 6) in the leftward/rightward direction along the first rod 36 and the second rod 37.

In addition, the body module 15 is provided with a third lens group frame (second movable lens frame) 47 made of synthetic resin. An insertion hole 48 in which the second rod 37 is inserted is formed through the lower part of the third lens group frame 47, and a rotation prevention groove 49 in which the first rod 36 is engaged is formed in the upper end of the third lens group frame 47. Accordingly, the third lens group frame 47 can slide on and along the first rod 36 and the second rod 37 in the leftward/rightward direction (while being prevented from rotating about the second rod 37). The body module 15 is provided with a third lens group (movable lens group/second movable lens group) LG3 configured of a lens (lens element) L6 and the optical axis thereof is coaxial with the optical axis of the second lens group LG2. The third lens group LG3 is fixedly fitted into a lens holding hole which is formed through the third lens group frame 47 in the leftward/rightward direction. A nut holding hole 50, both ends of which in the leftward/rightward direction are formed as open ends, is formed at the lower end of the third lens group frame 47, and a driven nut (lower driven nut) 44, through which a female screw hole with the axis thereof extending in the leftward/rightward direction is formed, is fixedly fitted into the nut holding hole 50 (the end of the nut holding hole 50 at the second rod 37 constitutes a rotation stop for the lower driven nut 44). The body module 15 is provided with a second motor M2 which is identical in specifications to the first motor M1 and fixed to the housing 16 in the lower part of the accommodating recess 18. The second motor M2 is provided with a rotary drive shaft M2a (identical in specifications to the rotary drive shaft M1a), and a male screw thread formed on the rotary drive shaft M2a in the vicinity of the end (left end with respect to FIG. 4) is screw-engaged with the aforementioned female screw hole of the lower driven nut 44. Therefore, forward and reverse rotations of the rotary drive shaft M2a that are caused by forward and reverse rotations of the second motor M2 cause the third lens group frame 47 (the third lens group L3) to move linearly between the telephoto extremity position (shown in FIGS. 4 and 5) and the wide-angle extremity position (shown in FIG. 6) in the leftward/rightward direction along the first rod 36 and the second rod 37.

The first lens group LG1 (L1, LP1, L2 and L3), the second lens group LG2 (L4 and L5), the third lens group LG3 (L6) and the second prism LP2 that have been described above are optical elements of an imaging optical system (bending optical system). A zooming operation is performed by moving the second lens group LG2 (the lenses L4 and L5) and the third lens group LG3 (the lens L6) along the first rod 36 and the second rod 37, and a focusing operation is performed by moving only the third lens group LG3 along the first rod 36 and the second rod 37.

It should be noted that the housing 16, the first rod 36, the second rod 37, the imaging optical system, the first motor M1 and the second motor M2 are components of the body module 15.

The body module 15 is provided, in the vicinity of the first rod 36 in the accommodating recess 18, with a columnar guide bar (upper guide bar) 52 made of metal which extends parallel to the first rod 36, the second rod 37 and an optical axis A of the lenses L2 through L6. The left end of the guide bar 52 is fixed to the second lens group frame 39 in the vicinity of the upper end thereof. A metal slidable cylinder (upper slidable cylinder) 53 is fitted on the guide bar 52 to be freely slidable thereon. The guide bar 52 is integrally provided at the right end thereof with a stopper 52a that is disk-shaped, the diameter of which is greater than the inner diameter of the slidable cylinder 53. A compression coil spring (biaser) S1 is installed around the first rod 36 and positioned between the second lens group frame 39 and the slidable cylinder 53. The left end and the right end of the compression coil spring S1 are fixed to the second lens group frame 39 and the slidable cylinder 53, respectively. When no external force is applied to the slidable cylinder 53 (when the slidable cylinder 53 is at the telephoto extremity position thereof), the compression coil spring S1 is in a free state in which the slidable cylinder 53 is positioned between the right end of the compression coil spring S1 and the stopper 52a (a space is provided between the slidable cylinder 53 and the stopper 52a).

The body module 15 is provided with a first light shield frame 54 made of a lightproof material, the upper end of which is fixed to the slidable cylinder 53. The first light shield frame 54 is a planar member orthogonal to the axis of the guide bar 52. The first light shield frame 54 is provided at a center thereof with a light-bundle limiting aperture 54a in the shape of a rectangle. The first light shield frame 54 is provided at the upper end thereof with a fixing hole 54b which is fixedly engaged with the slidable cylinder 53, and the first light shield frame 54 is provided at the lower end thereof with a rotation prevention groove 54c in which the second rod 37 is engaged. Movement of the slidable cylinder 53 together with the guide bar 52 and the second lens group frame 39 in the leftward/rightward direction causes the first light shield frame 54 to slide on and along the second rod 37 in the leftward/rightward direction.

Figure 8:
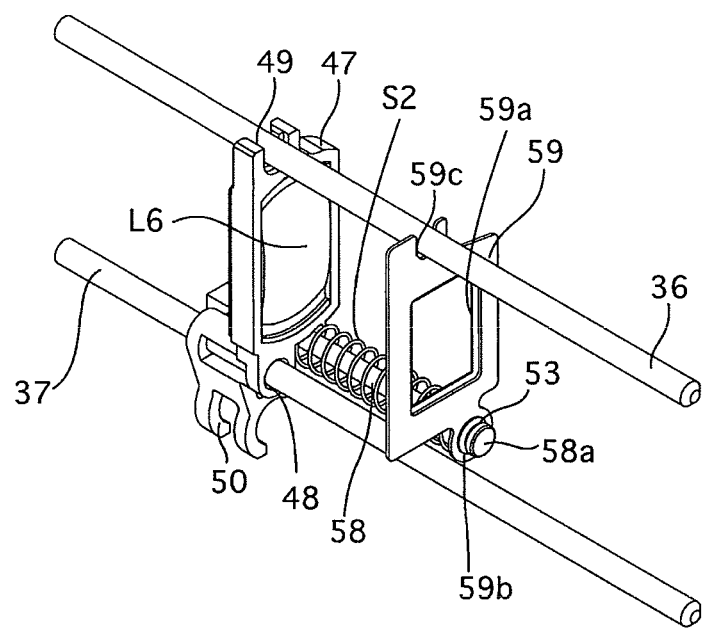
FIG. 8 is a perspective view of a third lens group frame, a second light shield frame and peripheral parts.

The body module 15 is provided, in the vicinity of the second rod 37 in the accommodating recess 18, with a columnar guide bar (lower guide bar) 58 (see FIGS. 1 and 8) which is identical in specifications to the upper guide bar 52 and extends parallel to the guide bar 52. The left end of the guide bar 58 is fixed to the third lens group frame 47 in the vicinity of the lower end thereof. A metal slidable cylinder (lower slidable cylinder) 53 (identical in specifications to the upper slidable cylinder 53) is fitted on the guide bar 58 to be freely slidable thereon. The guide bar 58 is integrally provided at the right end thereof with a stopper 58a that is disk-shaped, the diameter of which is greater than the inner diameter of the lower slidable cylinder 53. A compression coil spring (biaser) S2 is installed on the second rod 37 and positioned between the third lens group frame 47 and the lower slidable cylinder 53 in a compressed state (resiliently deformed state). The compression coil spring S2 provides a biasing force so that the lower slidable cylinder 53 is biased to move rightward, and accordingly, the lower slidable cylinder 53 abuts the stopper 58a when no leftward external force is applied to the lower slidable cylinder 53.

The body module 15 is provided with a second light shield frame 59 which is positioned between the first light shield frame 54 and the second prism LP2 and the lower end of which is fixed to the lower slidable cylinder 53 that is supported by the guide bar 58. The second light shield frame 59 is made of a lightproof material and configured from a planar member orthogonal to the axis of the guide bar 58. The second light shield frame 59 is provided at a center thereof with a light-bundle limiting aperture 59a in the shape of a rectangle. The second light shield frame 59 is provided at the lower end thereof with a fixing hole 59b which is fixedly engaged with the lower slidable cylinder 53, and the second light shield frame 59 is provided at the upper end thereof with a rotation prevention groove 59c in which the first rod 36 is engaged. Movement of the lower slidable cylinder 53, which is supported by the guide bar 58, together with the guide bar 58 and the third lens group frame 47 in the leftward/rightward direction causes the second light shield frame 59 to slide on and along the first rod 36 in the leftward/rightward direction.

Among the above described components, the pair of limit projections 26, the second rod 37, the second lens group frame 39, the guide bar 52, the upper slidable cylinder 53 and the compression coil spring S1 are components of a light-shield-frame position adjustment mechanism for the first light shield frame 54. In addition, the pair of limit projections 26, the first rod 36, the third lens group frame 47, the lower slidable cylinder 53, the guide bar 58 and the compression coil spring S2 are components of a light-shield-frame position adjustment mechanism for the second light shield frame 59.

The board module 65 is provided with a circuit board 66. The circuit board 66 has substantially the same front shape as that shape of the accommodating recess 18 and is configured from a flat plate orthogonal to the forward/rearward direction. The circuit board 66 is provided on the rear surface thereof with a printed circuit (not shown), and two circular holes 67 are formed through two diagonally opposite corners of the circuit board 66, respectively.

The board module 65 is provided with an image sensor (image pickup device) 69 (see FIGS. 1 and 5) which is fixed at the right end of the rear surface of the circuit board 66. A plurality of terminals (not shown) of the image sensor 69 are fixedly connected to the aforementioned printed circuit by soldering. The image sensor 69 is provided on the rear thereof with an imaging surface (not shown) orthogonal to the forward/rearward direction. In addition, the image sensor 69 is provided, on the incident surface (the rear surface in the drawings), with a cover glass 70 which is made of a flat glass plate and fixedly installed so as to cover the entire imaging surface of the image sensor 69.

A rear surface (rear end) of the image sensor 69 is covered with a packing (fixer) 72 made of an elastic material such as rubber which is open at the front and left sides. The packing 72 is provided with an exposing hole (through-hole) 73 through which the entire imaging surface of the image sensor 69 is rearwardly exposed, and is further provided on the right-hand side of the exposing hole 73, with a through-hole 74.

The circuit board 66, the image sensor 69 and the packing 72 that have been described above are components of the board module 65.

The cover (casing) 76 is a press-molded sheet metal product and is integrally provided with a base 77, two (upper and lower) short engaging lugs 78, two (upper and lower) long engaging lugs (resilient engaging lug) 79 and a pair of (upper and lower) side engaging lugs (resilient engaging lugs) 81. The base 77 is formed as a planar member orthogonal to the forward/rearward direction. The upper short engaging lug 78 and the upper long engaging lug 79 extend rearward from the upper edge of the base 77, and the lower short engaging lug 78 and the lower long engaging lug 79 extend rearward from the lower edge of the base 77. The pair of side engaging lugs 81 extend rearward from the right edge of the base 77. Each side engaging lug 81 is in shape of a letter T as viewed from a side thereof. The base 77 is slightly greater in size (dimensions) than the circuit board 66 and has a substantially rectangular shape with a size capable of closing the front opening (defined by the accommodating recess 18) of the housing 16 (this size is substantially the same as or greater than the front opening of the housing 16). The base 77 is provided with three pressure leaves 84, 85 and 86 each of which is resiliently deformable in the forward/rearward direction.

The pressure leaves 84, 85 and 86 are provided with pressure projections 84a, 85a and 86a, respectively, which project rearwardly (portions of the front surfaces of the pressure leaves 84, 85 and 86 which respectively correspond to the pressure projections 84a, 85a and 86a are dent (recessed) rearward). The pressure leaves 84, 85 and 86 in a free state lie in a plane in which the other part of the base 77 lies.

An engaging hole 80 and an engaging hole 82 are formed through each long engaging lug 79 and each side engaging lug 81, respectively.

To install the board module 65 and the cover 76 to the body module 15, firstly the front opening of the accommodating recess 18 is closed by the circuit board 66 so that the outer edge of the rear surface of the circuit board 66 comes into surface contact with the board support surface 27 while the two circular holes 67 of the circuit board 66 are brought into engagement with the two lock projections 28 (thereupon, the front surface of the circuit board 66 and the front surface of the housing 16 substantially lie in a common plane). Thereupon, as shown in FIG. 5, the three positioning projections 23 of the housing 16 forwardly pass through the exposing hole 73 and the through-hole 74 of the packing 72 so that the flat positioning surfaces 24 of the three positioning projections 23 come in surface contact with a flat rear surface of the cover glass 70 (at the outer periphery of a rear surface portion immediately behind the imaging surface of the image sensor 69) and so that a clearance (gap) is formed in the forward/rearward direction between the cover glass 70 and the second prism LP2 (exit surface LP2-b). In addition, the imaging surface of the image sensor 69 faces the exit surface LP2-b of the second prism LP2 in the forward/rearward direction through the exposing hole 73. Additionally, a rear surface of the packing 72 comes in contact with the front surface of the positioning portion 22.

Subsequently, the base 77 fully covers, from the front, a portion of the front of the housing 16 from the partition wall 19 rightward to fix the cover 76 to the housing 16 by respectively engaging the upper and lower short engaging lugs 78 with the first engaging recesses 30, respectively engaging the upper and lower engaging holes 80 of the upper and lower long engaging lugs 79 with the upper and lower engaging projections 32, and respectively engaging the engaging holes 82 of the upper and lower side engaging lugs 81 with the upper and lower engaging projections 34.

Upon the imaging unit 10 being assembled in the above described manner, the circuit board 66 and the image sensor 69 are pressed rearward due to the pressure projections 84a, 85a and 86a of the pressure leaves 84, 85 and 86 coming in contact with a right-hand side portion of the front surface of the circuit board 66 so that a pressing force (biasing force) in the rearward direction acts on the front side of the circuit board 66 from the pressure leaves 84, 85 and 86 (via the pressure projections 84a, 85a and 86a) that are slightly resiliently deformed forwardly. Thereupon, an integral combination of the circuit board 66 and the image sensor 69 is held from the front and the rear sides thereof between the flat positioning surfaces 24 of the three positioning projections 23 and the pressure projections 84a, 85a and 86a of the cover 76, and accordingly, the circuit board 66 and the image sensor 69 are precisely positioned with respect to the housing 16 and the second prism LP2 in the forward/rearward direction by the three positioning projections 23 of the housing 16 and the pressure projections 84a, 85a and 86a of the cover 76.

Since the cover 76 is made of metal, each of the base 77 and the pressure leaves 84, 85 and 86 exhibits an appropriate mechanical strength even if the thickness of the cover 76 is small. Therefore, even if an external force is exerted on the imaging unit 10 or vibrations occur in the imaging unit 10 when it is attempted to reduce the thickness of the entire imaging unit 10 by reducing the thickness the circuit board 66 and the cover 76, the position of the image sensor 69 (the imaging surface thereof) in the forward/rearward direction is held at a predetermined design position.

Moreover, the positioning of the image sensor 69 with respect to the housing 16 and the second prism LP2 does not cause an increase in the number of components because such positioning is carried out using the cover 76.

In addition, the positioning (installation) of the image sensor 69 and the housing 16 (the second prism LP2) can be easily carried out because the positioning of the image sensor 69 with respect to the housing 16 (the second prism LP2) is achieved by mechanical engagement of the three positioning projections 23 (that serve as a spacer), which are integrally formed with the housing 16 to project therefrom, with the image sensor 69 (the cover glass 70). In addition, since the image sensor 69 and the second prism LP2 can be easily separated from each other, the re-positioning of the image sensor 69 and the second prism LP2 can be easily carried out (the image sensor 69 and the second prism LP2 can be easily reused) in the case where, e.g., the distance between the image sensor 69 and the second prism LP2 in the forward/rearward direction deviates from a designed value or the positioning of the image sensor 69 and the second prism LP2 is carried out with dust or the like entering between the image sensor 69 and the second prism LP2.

Additionally, since the rear surface of the packing 72 is made to contact the front surface of the positioning portion 22 of the housing 16 with the packing 72 put on the rear of the image sensor 69, dust or the like outside of the packing 72 can be prevented from entering in between the packing 72 and the image sensor 69 and adhering to the imaging surface of the image sensor 69.

Additionally, since the image sensor 69 is fixed (positioned with respect) to the housing 16 (which includes the three positioning projections 23 that serve as a spacer) with the second prism LP2 and the image sensor 69 spaced from each other and with the second prism LP2 fixed (positioned with respect) to the housing 16 (the prism mounting recess 25), the image sensor 69 does not tilt relative to the housing 16; moreover, the reflecting surface of the second prism LP2 and the imaging surface of the image sensor 69 are precisely positioned with respect to each other even if the exit surface LP2-*b* of the second prism LP2 is not orthogonal to the forward/rearward direction (namely, even if the reflecting surface of the second prism LP2 and the exit surface LP2-*b* of the second prism LP2 are formed so that the angle therebetween slightly deviates from a predetermined design angle), and accordingly, the occurrence of any slight deviation of the exit surface LP2-*b* exerts substantially no adverse influence on images captured by the image sensor 69.

Since the cover 76 in the present embodiment of the imaging unit is made of metal, each of the base 77 and the pressure leaves 84, 85 and 86 exhibits an appropriate mechanical strength even if the thickness of the cover 76 is small. Therefore, even if an external force is exerted on the imaging unit 10 or vibrations occur in the imaging unit 10 when attempts are made to reduce the thickness of the entire imaging unit 10 by reducing the thickness the circuit board 66 and the cover 76, the position of the image sensor 69 (the imaging surface thereof) in the forward/rearward direction is held at a predetermined design position.

Moreover, the positioning of the image sensor 69 with respect to the housing 16 and the second prism LP2 does not cause an increase in the number of components because such positioning is carried out using the cover 76.

If the imaging unit 10 is directed toward an object located in front of the imaging unit 10, light reflected by the object (light emanating from a photographic object) enters the first prism LP1 through the incident surface LP1-*a* after passing through the lens L1 and is reflected at an angle of 90 degrees by an inner surface of the first prism LP1 to travel toward the exit surface LP-1*b*. Subsequently, the reflected light that emerges from the exit surface LP1-*b* enters the second prism LP2 from the incident surface LP2-*a* after passing through the lenses L2 through L6, the light-bundle limiting aperture 54*a* of the first light shield frame 54 and the light-bundle limiting aperture 59*a* of the second light shield frame 59, and is reflected at an angle of 90 degrees by an inner surface of the second prism LP2 to travel toward the exit surface LP-2*b*. Subsequently, the reflected light that emerges from the exit surface LP2-*b* is captured (received) by the aforementioned imaging surface of the image sensor 69 after passing through the exposing hole 73 and the cover glass 70.

Even if an external force is exerted on the imaging unit 10 or vibrations occur in the imaging unit 10 as described above, the position of the image sensor 69 (the imaging surface thereof) in the forward/rearward direction is held at a predetermined design position with precision, and accordingly, a sharp object image with no blur can be captured by the image sensor 69 even if an external force is exerted on the imaging unit 10 or vibrations occur in the imaging unit 10 as described above.

Additionally, if the above described imaging optical system is driven to perform a zooming operation and a focusing operation by moving the second lens group LG2 (the lenses L4 and L5) and the third lens group LG3 (the lens L6) along the first rod 36 and the second rod 37 with the first motor M1 and the second motor M2, an image capturing operation in a state where the imaging optical system is zoomed and focused on a photographic object image becomes possible.

Although the present invention has been described based on the above illustrated embodiment, it is possible to make various modifications to the above illustrated embodiment.

Figure 9:
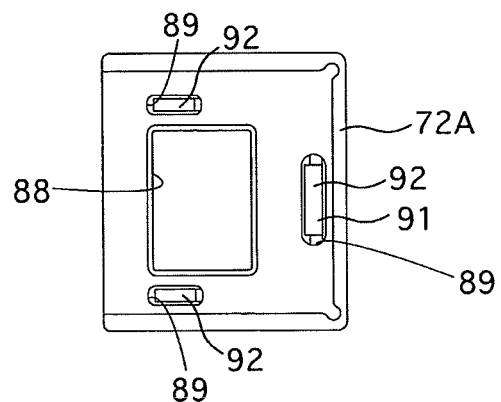
FIG. 9 is a front elevational view of a combination of a packing and a spacer in a modified embodiment of the imaging unit.
Figure 10:
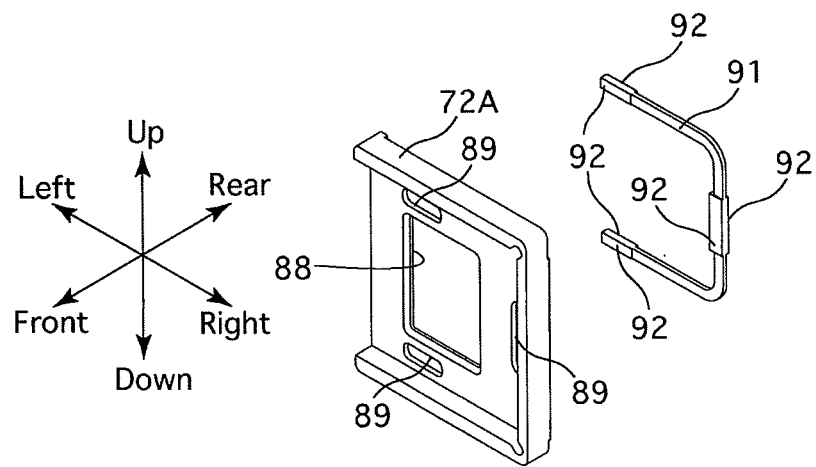
FIG. 10 is an exploded perspective view of the combination of the packing and the spacer shown in FIG. 9.
Figure 11:
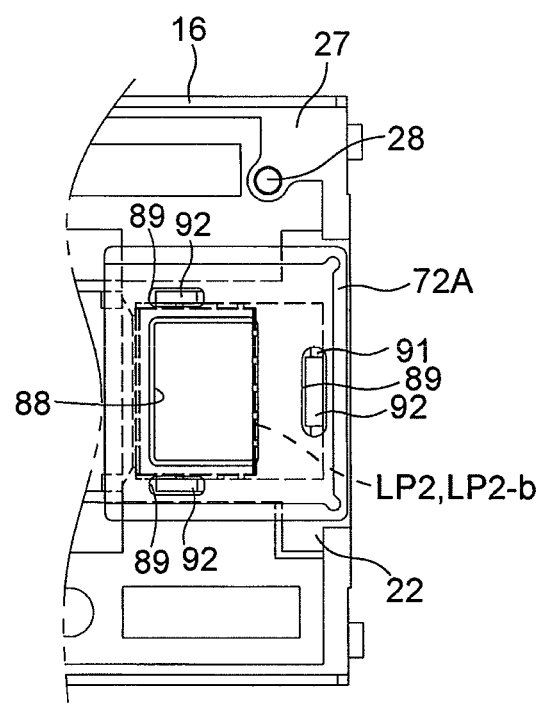
FIG. 11 is an enlarged front elevational view of a right portion of the modified embodiment of the imaging unit with the cover removed.

For instance, FIGS. 9 through 11 show a modified embodiment of the imaging unit.

The housing 16 of this modified embodiment is not equipped with the three positioning projections 23 that serve as a spacer. A packing (fixed member) 72A is made of the same material as the packing 72 and is substantially identical in shape to the packing 72, and a U-shaped spacer 91 which is made of a material (e.g., metal or resin) harder than the material of the packing 72 is embedded into the packing 72A to be integral therewith. The packing 72A is molded by insertion molding with a mold (not shown) in which the spacer 91 is placed. The packing 72A is provided with an exposing hole 88 and three through-holes 89. The exposing hole 88 is formed as a through-hole at a center of the packing 72A, and the three through-holes 89 are formed around the exposing hole 88. The spacer 91 is provided with three protruding portions, each of which protrudes both forward and rearward from the remaining portion of the spacer 91, and both the front and rear surfaces of each protruded portion of the spacer 91 are formed as flat positioning surfaces 92, each of which is orthogonal to the forward/rearward direction. The portion of the spacer 91 other than the three protruded portions (and portions adjacent the three protruded portions) are embedded into the packing 72A (so as not to be exposed outwardly). The three protruded portions of the spacer 91 are positioned to correspond to the three through-holes 89 of the packing 72A, respectively. The front flat positioning surfaces 92 of the three protruded portions of the spacer 91 are positioned to lie in a plane in which a front surface (in which the exposing hole 88 is formed) of the packing 72A lies (or to lie in a plane slightly behind a plane in which the aforementioned front surface of the packing 72A lies), and the rear flat positioning surfaces 92 of the three protruded portions of the spacer 91 are positioned to lie in a plane in which a rear surface of the packing 72A lies (or to lie in a plane slightly in front of a plane in which the aforementioned rear surface of the packing 72A lies).

Similar to the above described embodiment of the imaging unit shown in FIGS. 1 through 8, when the packing 72A is brought into contact with (to cover) the rear side of the image sensor 69 and the rear surface of the packing 72A is made to contact the front surface of the positioning portion 22, the three flat positioning surfaces 92 on the front side of the spacer 91 come in surface contact with the flat rear surface (outer periphery of the area behind the imaging surface) of the cover glass 70 of the image sensor 69 while the three flat positioning surfaces 92 on the rear side of the spacer 91 come in surface contact with the front surface of the positioning portion 22, which creates a clearance between the cover glass 70 and the second prism LP2 (the exit surface LP2-b) in the forward/rearward direction.

Hence, operations and effects similar to those obtained in the above described embodiment of the imaging unit shown in FIGS. 1 through 8 can also be obtained in the modified embodiment of the imaging unit shown in FIGS. 9 through 11.

Figure 12:
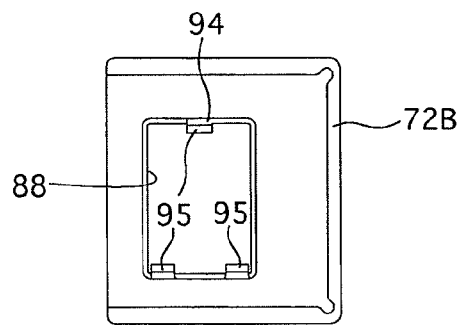
FIG. 12 is a combination of a packing and a spacer in another modified embodiment of the imaging unit.
Figure 13:
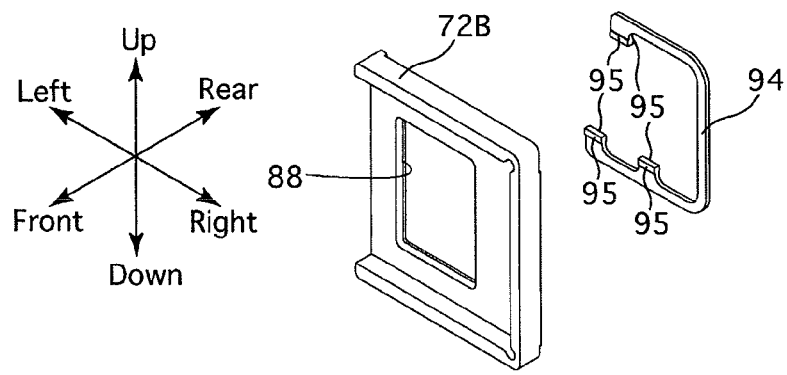
FIG. 13 is a view similar to that of FIG. 10, showing the packing and the spacer shown in FIG. 12.
Figure 14:
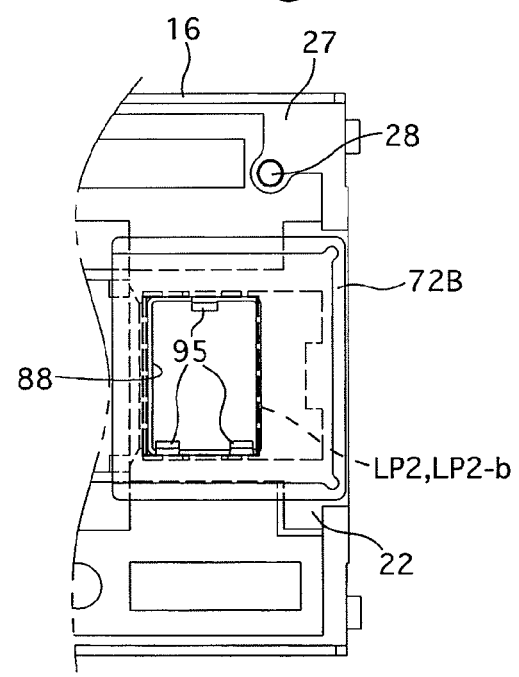
FIG. 14 is a view similar to that of FIG. 11, showing a right portion of the another modified embodiment of the imaging unit that includes the packing and the spacer shown in FIGS. 12 and 13.

FIGS. 12 through 14 show another modified embodiment of the imaging unit.

The housing 16 of this modified embodiment is not equipped with the three positioning projections 23 that serve as a spacer. A packing (fixed member) 72B is made out of the same material as that of the packing 72A and has in the same shape as that of the packing 72A except that the packing 72B does not have the through-holes 89 of the packing 72A. A C-shaped spacer 94 which is made of the same material as the spacer 91 is embedded into the packing 72B to be integral therewith. The packing 72B is molded by insertion molding with a mold (not shown) in which the spacer 94 is placed. The packing 72B is provided at a center thereof with an exposing hole 88. The spacer 94 is provided with three protruding portions, each of which protrudes forward from the remaining portion of the spacer 94, and both the front and rear surfaces of each protruding portions are formed as flat positioning surfaces 95, each of which is orthogonal to the forward/rearward direction. The portion of the spacer 94 other than the three protruded portions (and portions adjacent the three protruded portions) are embedded in the packing 72B (so as not to be exposed outwardly). The three protruded portions of the spacer 94 are positioned in the exposing hole 88. The front flat positioning surfaces 95 of the three protruded portions of the spacer 94 are positioned to lie in a plane in which a front surface of the packing 72B (in which the exposing hole 88 is formed) lies (or to lie in a plane slightly behind a plane in which the aforementioned front surface of the packing 72B lies), and the rear flat positioning surfaces 95 of the three protruded portions of the spacer 94 are positioned to lie in a plane in which a rear surface of the packing 72B lies (or to lie in a plane slightly in front of a plane in which the aforementioned rear surface of the packing 72B lies).

Similar to the above described embodiments, when the packing 72B is brought into contact with (to cover) the rear side of the image sensor 69 and the rear surface of the packing 72B is made to contact the front surface of the positioning portion 22, the three flat positioning surfaces 95 on the front side of the spacer 94 come in surface contact with the flat rear surface (outer periphery of the area behind the imaging surface) of the cover glass 70 of the image sensor 69 while the three flat positioning surfaces 95 on the rear side of the spacer 94 come in surface contact with the perimeter of the exit surface LP2-b of the exit-side surface LP2, which forms a clearance between the cover glass 70 and the second prism LP2 (the exit surface LP2-b) in the forward/rearward direction.

Hence, operations and effects similar to those obtained in each of the above described embodiment of the imaging unit shown in FIGS. 1 through 8 and the above described modified embodiment of the imaging unit shown in FIGS. 9 through 11 can also be obtained in the modified embodiment of the imaging unit shown in FIGS. 12 through 14.

Figure 15:
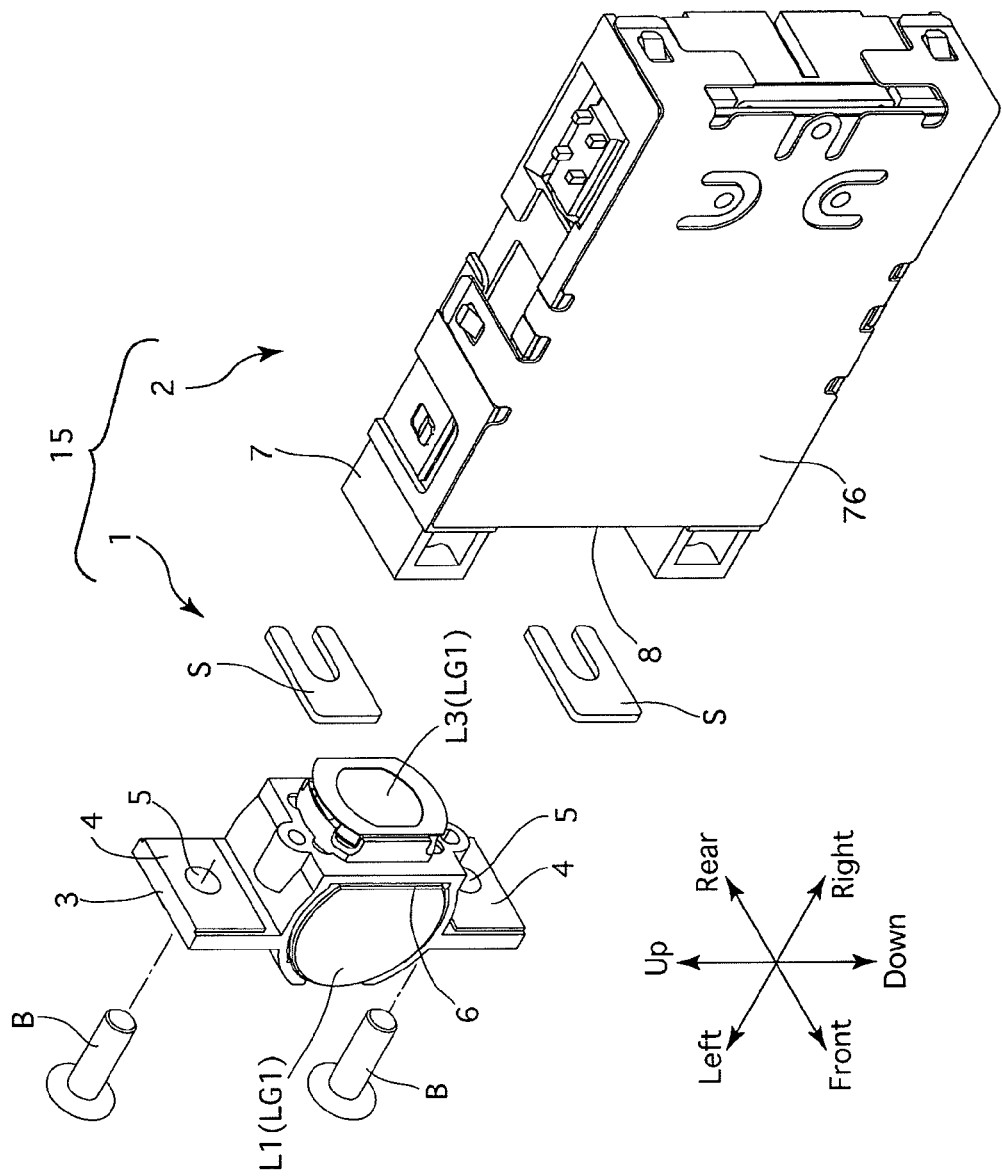
FIG. 15 is an exploded perspective view of yet another modified embodiment of the imaging unit.

Additionally, as shown in FIG. 15, it is possible for the body module 15 to be configured of a first lens group unit 1 and a body unit 2 that are independent of each other and for the housing (which corresponds to the housing 16) of the body module 15 be configured of two components (a holder 3 and a main housing 7).

The first lens group unit 1 is provided with a holder 3 formed as a synthetic-resin molded product. The holder 3 is provided at the left end thereof with a pair of (upper and lower) lugs 4, each of which has a through-hole 5. A prism accommodating space which is open at the front and right sides is formed in the holder 3. The holder 3 is provided at the front opening of the prism accommodating space with a front lens holding hole 6 which is open at the front and at a left portion thereof, and is provided at the right opening of the prism accommodating space with a right lens holding hole. The first prism LP1 is fitted into the prism accommodating hole to be fixed therein, and the lens L1 is fitted into the front lens holding hole 6 to be fixed therein. In addition, the lenses L2 and L3 are fitted into the right lens holding hole to be fixed therein.

The main housing 7 of the body unit 2 is identical in structure to the housing 16 from which a left end portion thereof (which corresponds to the holder 3) is removed, and is provided at the left end of the main housing 7 with an installation recess 8. In addition, the same components as those installed in the accommodating recess 18 of the housing 16 are installed in the accommodating recess 18 of the main housing 7, and the front of the main housing 7 is covered with the cover 76.

The first lens group unit 1 and the body unit 2 are fixed together as one unit by inserting from the left side a pair of set screws B into the upper and lower through-holes 5 of the holder 3 and screwing the male thread portions of the pair of set screws B into a pair of female screw holes (not shown) formed in upper and lower left end surfaces of the main housing 7 with a portion of the holder 3 which is positioned on the right-hand side of the pair of lugs 4 being fitted into the installation recess 8 and with a pair of (upper and lower) spacers S held between the upper and lower lugs 4 of the holder 3 and the upper and lower left end surfaces of the main housing 7 (that are the left end surfaces of a pair of projections of the main housing 7 which are formed on the vertically opposite sides of the installation recess 8).

Upon the first lens group unit 1 and the body unit 2 being fixed together as one unit, the right end of the holder 3 (in which the right lens holding hole is formed) is fitted into the communication hole 20 (not shown in FIG. 15) of the partition wall 19 of the main housing 7, and the optical axis A of the lenses L2 and L3 coincides with the optical axis of the second lens group LG2 and the third lens group LG3.

In addition, the pressure leaves 84, 85 and 86 can be made to be inclined rearwardly with respect to the base 77 when the pressure leaves 84, 85 and 86 are in free state so that the free ends thereof are positioned behind the peripheral portions that surround the pressure leaves 84, 85 and 86, respectively, on the front surface of the base 77. This structure makes it possible to increase the aforementioned pressing force that is applied to the circuit board 66 from the pressure leaves 84, 85 and 86 (the pressure projections 84a, 85a and 86a) when the cover 76 is fixed to the housing 16.

In the case where the pressure leaves 84, 85 and 86 are made to be inclined rearwardly, the pressure projections 84a, 85a and 86a can be omitted.

The number of the pressure leaves (84, 85 and 86) of the cover 76 can be one or two, or more than three.

Alternatively, the pressure leaves 84, 85 and 86 can be omitted from the base 77 by forming projections corresponding to the pressure projections 84a, 85a and 86a on the back of the base 77.

Figure 16:
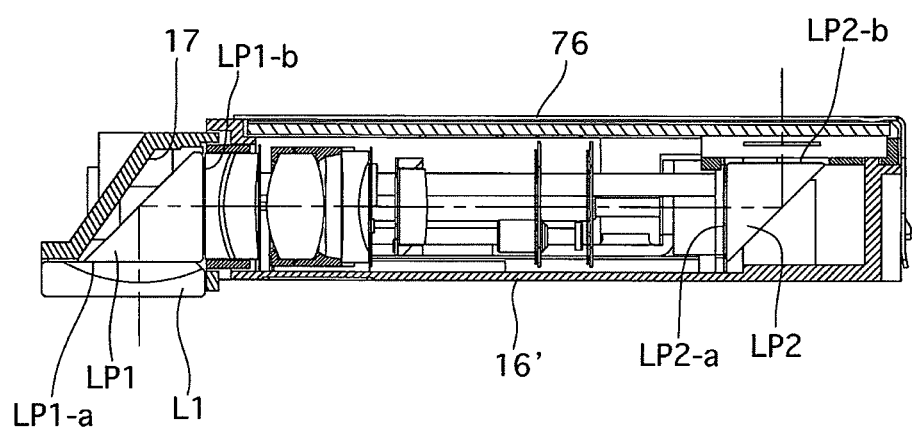
FIG. 16 is a view similar to that of FIG. 5, showing yet another modified embodiment of the imaging unit.

Additionally, the direction of the optical path passing through the imaging optical system (the first lens group LG1, the second lens group LG2, the third lens group LG3 and the second prism LP2) can be changed by making the lens L1 exposed toward the opposite side of the imaging unit 10 from the cover 76 side in the forward/rearward direction by modifying the shape of a housing 16' as shown in FIG. 16 (a modification in which a portion of the housing which corresponds to the holder 3 shown in the modified embodiment in FIG. 10 is inverted in the forward/rearward direction).

In the embodiment of the imaging unit shown in FIGS. 1 through 8, the three positioning portions 23 (that serve as a spacer) of the housing 16 can be molded independently of the housing 16 and fixed to the housing 16 after being molded.

Additionally, the first prism LP1 can be replaced by a mirror.

Additionally, it is possible for the imaging optical system (bending optical system) to include only one prism.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging unit comprising:
   a housing having an opening on one of opposite sides thereof in a direction of thickness of said housing;
   an imaging optical system which is provided in said housing and includes an incident surface and an exit-side prism, wherein object-emanated light being incident on said incident surface and traveling in a lengthwise direction of said housing is reflected by said exit-side prism toward said opening;
   an image sensor which is installed in said housing and includes an imaging surface that faces the other of said opposite sides of said housing in said direction of thickness of said housing to face an exit surface of said exit-side prism;
   a spacer which projects from one of said housing and a fixed member, which is immovable with respect to said housing, said spacer being in contact with said image sensor to create a clearance between said exit surface and said imaging surface; and
   a cover which is fixed to said housing so as to close said opening and presses said image sensor so that said image sensor comes in contact with said spacer;
   wherein said housing comprises a prism mounting recess which accommodates said exit-side prism, and
   wherein said spacer is integrally formed with said housing so as to project toward said image sensor from a periphery of said prism mounting recess.

2. An imaging unit comprising:
   a housing having an opening on one of opposite sides thereof in a direction of thickness of said housing;
   an imaging optical system which is provided in said housing and includes an incident surface and an exit-side prism, wherein object-emanated light being incident on said incident surface and traveling in a lengthwise direction of said housing is reflected by said exit-side prism toward said opening;
   an image sensor which is installed in said housing and includes an imaging surface that faces the other of said opposite sides of said housing in said direction of thickness of said housing to face an exit surface of said exit-side prism;
   a spacer which projects from one of said housing and a fixed member, which is immovable with respect to said housing, said spacer being in contact with said image sensor to create a clearance between said exit surface and said imaging surface; and
   a cover which is fixed to said housing so as to close said opening and presses said image sensor so that said image sensor comes in contact with said spacer;
   wherein said housing comprises a prism mounting recess which accommodates said exit-side prism, and
   wherein said imaging unit further comprises a packing made of an elastic material which is in contact with both a periphery of said prism mounting recess of said housing and with an outer periphery of said imaging surface of said image sensor.

3. The imaging unit according to claim 2, wherein said packing includes a through-hole, said spacer passing through said through-hole to come in contact with said image sensor.

4. The imaging unit according to claim 3, wherein said through-hole of said packing serves as an exposing hole through which said exit surface of said exit-side prism is exposed toward said imaging surface.

5. The imaging unit according to claim 3, wherein said packing is provided with an exposing hole which is formed independently of said through-hole and through which said exit surface of said exit-side prism is exposed toward said imaging surface.

6. An imaging unit comprising:
   a housing having an opening on one of opposite sides thereof in a direction of thickness of said housing;
   an imaging optical system which is provided in said housing and includes an incident surface and an exit-side prism, wherein object-emanated light being incident on said incident surface and traveling in a lengthwise direction of said housing is reflected by said exit-side prism toward said opening;
   an image sensor which is installed in said housing and includes an imaging surface that faces the other of said opposite sides of said housing in said direction of thickness of said housing to face an exit surface of said exit-side prism;
   a spacer which projects from one of said housing and a fixed member, which is immovable with respect to said housing, said spacer being in contact with said image sensor to create a clearance between said exit surface and said imaging surface; and
   a cover which is fixed to said housing so as to close said opening and presses said image sensor so that said image sensor comes in contact with said spacer;
   wherein said housing comprises a prism mounting recess which accommodates said exit-side prism, and
   wherein said spacer is provided independently of said housing and is in contact with both a periphery of said prism mounting recess of said housing and with an outer periphery of said imaging surface of said image sensor.

7. The imaging unit according to claim 6, wherein said housing comprises a prism mounting recess which accommodates said exit-side prism;
- wherein said fixed member comprises a packing made of an elastic material which is in contact with both a periphery of said prism mounting recess of said housing and with an outer periphery of said imaging surface of said image sensor; and
- wherein said spacer is made of a material harder than a material of said packing and is integrally formed with said packing.

8. An imaging unit comprising:
- a housing having an opening on one of opposite sides thereof in a direction of thickness of said housing;
- an imaging optical system which is provided in said housing and includes an incident surface and an exit-side prism, wherein object-emanated light being incident on said incident surface and traveling in a lengthwise direction of said housing is reflected by said exit-side prism toward said opening;
- an image sensor which is installed in said housing and includes an imaging surface that faces the other of said opposite sides of said housing in said direction of thickness of said housing to face an exit surface of said exit-side prism;
- a spacer which projects from one of said housing and a fixed member, which is immovable with respect to said housing, said spacer being in contact with said image sensor to create a clearance between said exit surface and said imaging surface; and
- a cover which is fixed to said housing so as to close said opening and presses said image sensor so that said image sensor comes in contact with said spacer;
- wherein said spacer is provided independently of said housing and is in contact with both said exit surface of said exit-side prism and with an outer periphery of said imaging surface of said image sensor.

* * * * *